US006780905B2

(12) United States Patent
Bienmüller et al.

(10) Patent No.: US 6,780,905 B2
(45) Date of Patent: Aug. 24, 2004

(54) FLAME-PROOF POLYESTER MOLDING COMPOSITIONS COMPRISING ZNS

(75) Inventors: Matthias Bienmüller, Krefeld (DE); Michael Wagner, Moers (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/178,196

(22) Filed: Jun. 24, 2002

(65) Prior Publication Data

US 2003/0083408 A1 May 1, 2003

(30) Foreign Application Priority Data

Jun. 27, 2001 (DE) .......................................... 101 30 834

(51) Int. Cl.$^7$ ............................. C08K 5/34; C08K 5/52; C08K 3/30
(52) U.S. Cl. ...................... 524/100; 524/101; 524/127; 524/420; 524/487; 524/494
(58) Field of Search ................................. 524/100, 101, 524/127, 420, 487, 494

(56) References Cited

U.S. PATENT DOCUMENTS 5,814,690 A    9/1998  Penn ........................... 524/100

FOREIGN PATENT DOCUMENTS

| JP | 3-281652 | 12/1991 |
| JP | 6-157880 | 6/1994 |
| JP | 9-157503 | 6/1997 |
| WO | 00/11071 | 3/2000 |
| WO | 00/11085 | 3/2000 |
| WO | 01/81470 | 11/2001 |

*Primary Examiner*—Kriellion A. Sanders
(74) *Attorney, Agent, or Firm*—Joseph C. Gil; Aron Preis

(57) ABSTRACT

A thermoplastic molding composition having good flame retarding properties and thermal stability is disclosed. The composition contains A) one or more members selected from the group consisting of polyester, polycarbonate and polyester-carbonate, B) a flame retardant component containing a nitrogen compound and a phosphorus compound C) zinc sulphide and optional functional additives and fillers and/or reinforcing agents. The composition is suitable for the preparation molded articles, sheeting or fibers.

12 Claims, No Drawings

FLAME-PROOF POLYESTER MOLDING COMPOSITIONS COMPRISING ZNS

FIELD OF THE INVENTION

The present invention relates to halogen-free, flame-proof polyester molding compositions. The present invention further relates to the use of said molding compositions for the production of moldings, sheeting or fibers, and to the moldings, sheeting or fibers themselves.

SUMMARY OF THE INVENTION

A thermoplastic molding composition having good flame retarding properties and thermal stability is disclosed. The composition contains A) one or more members selected from the group consisting of polyester, polycarbonate and polyester-carbonate, B) a flame retardant component containing a nitrogen compound and a phosphorus compound C) zinc sulphide and optional functional additives and fillers and/or reinforcing agents. The composition is suitable for the preparation molded articles, sheeting or fibers.

BACKGROUND OF THE INVENTION

Polyester molding compositions which are rendered flame-proof are of considerable importance in the electrical/electronics field and are used for the production of supports for voltage-carrying parts, for example. Apart from good flame-resistance, these components also have to have good mechanical and electrical properties, and the provision of halogen-free molding compositions is increasingly being required.

For electrical and electronic applications in particular, it is important that the plastics molding compositions used have no negative effects on the corrosion behavior of metals or alloys which are in direct contact with them, in order to prevent the malfunction of components.

Since polyester molding compositions are often subjected to elevated temperatures of continuous use in applications such as these, the resistance of the molding composition to ageing caused by hot air is also an important aspect. This includes the discoloration behavior of plastic molding compositions at elevated temperatures of continuous use, wherein a discernible darkening of corresponding plastics moldings is generally undesirable, particularly for electrical and electronic components which are often produced in light colors. In this respect, for example, it has been shown that plastics molding compositions which contain resorcinol diphosphate in particular result in discoloration due to hot air ageing. The migration of constituents of plastics moldings is also undesirable, since this may result in a subsequent change in properties, such as deposits on the contacts of voltage-carrying parts, mechanical losses, or losses in the flame-resistance of the plastics molding composition or of the plastics molding.

Some developments have already been made in the past in this area.

Thus JP-A 3-281 652 discloses polyethylene terephthalate resins which contain a melamine-cyanuric acid addition product and a phosphate or phosphonate as flame retardants, as well as filler materials.

JP-A 6-157 880 discloses reinforced polyethylene terephthalates which contain melamine cyanurate and a phosphorus compound as flame retardants.

JP-A 9-157 503 discloses flame-proof polyester compositions which contain melamine cyanurate, esters of phosphoric acid and special de-molding agents.

Reinforced, flame-proof polyester components are known from EP-A 903 370 which contain a combination of melamine pyrophosphate and a phosphate oligomer.

WO 00/11085 discloses polyester molding compositions which contain melamine cyanurate, a phosphate and special de-molding agents.

WO 00/11 071 discloses polyester compositions which contain nitrogen compounds, phosphorus compounds, metal salts and stabilizers.

However, there is still a need for polyester molding compositions which are distinguished by an improved combination of good mechanical properties and flame retardant properties, good corrosion behavior, good electrical properties and good stability to hot air ageing.

DETAILED DESCRIPTION OF THE INVENTION

Surprisingly, it has now been found that polyester molding compositions which contain a flame retardant combination comprising amounts according to the invention of an organic phosphate, wherein bisphenol A diphosphate is most particularly preferred, and an organic nitrogen compound, wherein melamine cyanurate is most particularly preferred, in combination with zinc sulphide, exhibit the desired range of properties.

The present invention thus relates to flame-resistant molding compositions containing A) one or more polyesters,
B) 10 to 40% by weight, preferably 17 to 24% by weight, most preferably 19 to 24% by weight, of a flame retardant component containing
    B.1) a nitrogen compound, preferably a melamine compound, and
    B.2) a phosphorus compound of formula (I)

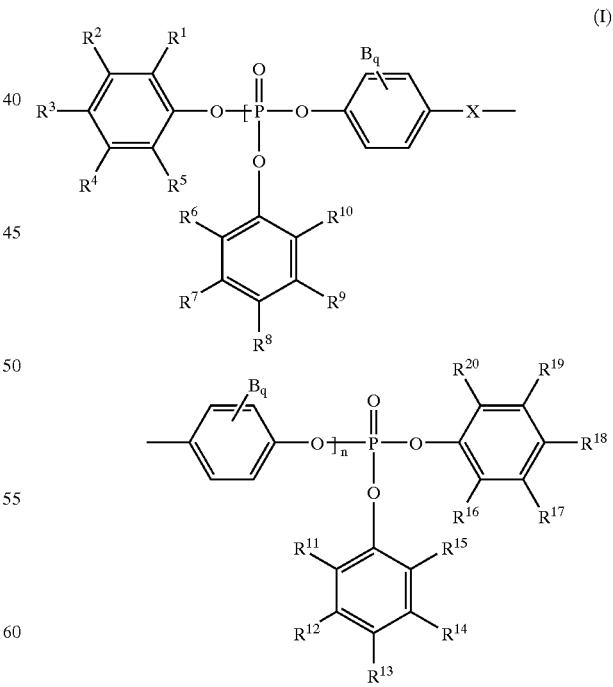

wherein
    $R^1$ to $R^{20}$, independently of each other, denote hydrogen or a linear or branched $C_{1-6}$ alkyl group,
    n denotes an average value of 0.5 to 50, and B in each case denotes a $C_1$–$C_{12}$ alkyl, preferably methyl, or a halogen, preferably chlorine and/or bromine, q denotes numbers which, independently of each other, represent 0, 1 or 2, X denotes a single bond, C=O, S, O, $SO_2$, $C(CH_3)_2$, a $C_1$–$C_5$ alkylene, a $C_2$–$C_5$ alkylidene, a $C_5$–$C_6$ cycloalkylidene or a $C_6$–$C_{12}$ arylene, on to which further aromatic rings, which optionally contain hetero atoms, may be condensed, or a radical corresponding to formulae (II) or (III)

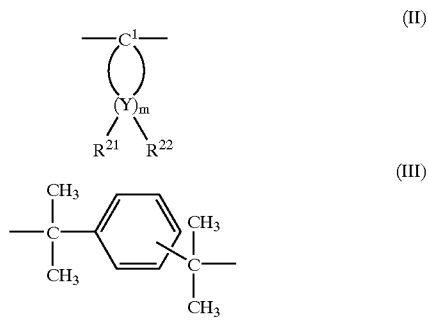

wherein
Y denotes carbon and
$R^{21}$ and $R^{22}$, independently of each other, denote hydrogen or a $C_1$–$C_6$ alkyl, preferably hydrogen, methyl or ethyl, which may be selected individually for each Y,
m denotes an integer from 4 to 7, preferably 4 or 5, with the proviso that $R^{21}$ and $R^{22}$ simultaneously denote alkyl on at least one Y atom, C) 0.01 to 5% by weight, preferably 0.1 to 4% by weight, most preferably 0.4 to 3.5% by weight, of zinc sulphide, D) 0 to 40%, preferred 0 to 30%, very preferred 0 to 10% relative to weight of the composition of at least one functional additive.

E) 0 to 50% by weight, preferably 10–40% by weight, most preferably 10–35% by weight, of one or more fillers and/or reinforcing agents, wherein the sum of the proportions of the components adds up to 100% by weight.

Component A

Polyesters in the sense of the present invention are polyalkylene terephthalates, i.e. reaction products of dicarboxylic acids, preferably aromatic dicarboxylic acids, or reactive derivatives thereof (e.g. dimethyl esters or anhydrides) and aliphatic, cycloaliphatic or araliphatic diols, and mixtures of said reaction products, or completely aromatic polyesters which are described in detail below.

Polyalkylene terephthalates may be produced by known methods from terephthalic acid (or reactive derivatives thereof) and aliphatic or cycloaliphatic diols containing 2 to 10 C atoms (Kunststoff-Handbuch, Volume VIII, pages 695 et seq., Karl-Hanser-Verlag, Munich 1973).

The preferred polyalkylene terephthalates contain at least 80, preferably 90 mol % with respect to the dicarboxylic acid, of terephthalic acid radicals, and at least 80, preferably at least 90 mol % with respect to the diol component, of ethylene glycol and/or 1,3-propanediol and/or 1,4-butanediol radicals.

In addition to terephthalic acid radicals, the preferred polyalkylene terephthalates may contain up to 20 mol % of radicals of other aromatic dicarboxylic acids containing 8 to 14 C atoms, or of aliphatic dicarboxylic acids containing 4 to 12 C atoms, such as radicals of phthalic acid, isophthalic acid, naphthalene-2,6-dicarboxylic acid, 4,4'-diphenyldicarboxylic acid, succinic acid, adipic acid, sebacic acid, azelaic acid or cyclohexane-diacetic acid.

Apart from ethylene or 1,3-propanediol or 1,4-butanediol radicals, the preferred polyalkylene terephthalates may contain up to 20 mol % of other aliphatic diols comprising 3 to 12 C atoms or cycloaliphatic diols comprising 6 to 21 C atoms, e.g. radicals of 1,3-propanediol, 2-ethylpropanediol-1,3, neopentyl glycol, 1,5-pentanediol, 1,6-hexanediol, cyclohexane-dimethanol-1,4,3-methylpentanediol-2,4,2-methylpentanediol-2,4, 2,2,4-trimethylpentanediol-1,3 and 1,6,2-ethylhexanediol-1,3, 2,2-diethylpropanediol-1,3, 2,5-hexanediol, 1,4-di-(β-hydroxyethoxy)-benzene, 2,2-bis-(4-hydroxycyelohexyl)-propane, 2,4-dihydroxy-1,1,3,3-tetramethyl-cyclobutane, 2,2-bis-(3-β-hydroxyethoxyphenyl)propane and 2,2-bis-(4-hydroxypropoxyphenyl)-propane (DE-OS 24 07 674, 24 07 776, 27 15 932).

The polyalkylene terephthalates may be branched by the incorporation of relatively small amounts of trihydric or tetrahydric alcohols or of tri- or tetrabasic carboxylic acids, such as those described in DE-OS 19 00 270 and U.S. Pat. No. 3,692,744, for example. Examples of preferred branching agents include trimesic acid, trimellitic acid, trimethylolethane and -propane, and pentaerythritol.

It is advisable to use not more than 1 mol % of the branching agent with respect to the acid component.

Particularly preferred polyalkylene terephthalates are those which are produced solely from terephthalic acid and reactive derivatives thereof, (e.g. dialkyl esters thereof) and ethylene glycol and/or 1,3-propanediol and/or 1,4-butanediol (polyethylene-, polypropylene- and polybutylene terephthalates), as well as mixtures of these polyalkylene terephthalates. Within the scope of the present invention, the use of mixtures of polybutylene- and polyethylene terephthalates is quite particularly preferred.

The preferred polyalkylene terephthalates also include copolyesters which are produced from at least two of the aforementioned acid components and/or from at least two of the aforementioned alcohol components; the most preferred copolyesters are poly(ethylene glycol/1,4-butanediol) terephthalates.

The polyalkylene terephthalates generally have an intrinsic viscosity of about 0.4 to 1.5, preferably 0.5 to 1.3, as measured in phenol/o-dichlorobenzene (1:1 parts by weight) at 25° C. in each case.

The completely aromatic polyesters which are also suitable are the reaction products of aromatic dicarboxylic acids or reactive derivatives thereof with corresponding aromatic dihydroxy compounds.

The aromatic compounds discussed above in the description of the polyalkylene terephthalates may be used as aromatic dicarboxylic acids. Mixtures of 5 to 100 mol % isophthalic acid and 0 to 95 mol % terephthalic acid, particularly mixtures ranging from about 80% terephthalic acid to 20% isophthalic acid to approximately equivalent mixtures of these two acids, are preferred.

The aromatic dihydroxy compounds which may also be used conform to formula (IV) below:

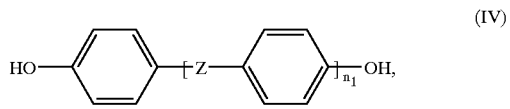

(IV)

wherein Z represents an alkylene or cycloalkylene group containing up to 8 carbon atoms, an arylene group containing up to 12 carbon atoms, a carbonyl group, an oxygen or a sulphur atom, a sulphonyl group or a chemical bond, and $n_1$ has a value from 0 to 2. These compounds may each comprise $C_1$–$C_6$ alkyl or alkoxy groups as well as fluorine, chlorine or bromine as substituents on their phenylene units.

Representatives of these substances include dihydroxyphenyl, di-(hydroxyphenyl)alkanes, di-(hydroxyphenyl)cycloalkanes, di-(hydroxyphenyl)sulphide, di-(hydroxyphenyl) ether, di-(hydroxyphenyl)ketone, di-(hydroxyphenyl)sulphoxide, di-(hydroxyphenyl), α,α'-di(hydroxyphenyl)dialkylbenzenes, di-(hydroxy-phenyl) sulphone, di-(hydroxybenzoyl)benzene, resorcinol and hydroquinone, as well as derivatives thereof which comprise alkylated or halogenated nuclei.

Of the aforementioned group, 4,4'-dihydroxydiphenyl, 2,4-di-(4'-hydroxyphenyl)-2-methylbutane, α,α'-di-(4-hydroxyphenyl)-p-diisopropylbenzene, 2,2-di-(3'-methyl-4'-hydroxyphenyl)propane and 2,2-di-(3'-chloro-4'-hydroxyphenyl)propane are preferred.

Moreover, 2,2-di-(3',5'-dimethyl-4'-hydroxyphenyl)propane, 2,2-di-(4'-hydroxyphenylpropane, 4,4'-dihydroxydiphenylsulphone, 2,2-di(3,5-di-chlorodihydroxyphenyl)propane, 1,1-di-(4'-hydroxyphenyl)cyclohexane and 3,4'-dihydroxybenzophenone are particularly preferred.

Mixtures of the aforementioned diol compounds may also be used.

Moreover, apart from pure polyalkylene terephthalates and pure, completely aromatic polyesters, any mixtures of these polyesters may be used, as may the polyesters cited below.

The term "polyesters" is also to be understood to mean polycarbonates and polyester carbonates.

Polycarbonates and polyester carbonates are known from the literature or may be produced by methods known from the literature (for the production of poly-carbonates, for example, see Schnell, "Chemistry and Physics of Polycarbonates", Interscience Publishers, 1964, as well as DE-A 1 495 626, DE-A 2 232 877, DE-A 2 703 376, DE-A 2 714 544, DE-A 3 000 610 and DE-A 3 832 396; for the production of polyester carbonates, see DE-A 3 077 934, for example).

Aromatic polycarbonates are produced, for example, by the reaction of diphenols with carbonic acid halides, preferably phosgene, and/or with aromatic dicarboxylic acid dihalides, preferably benzene-dicarboxylic acid dihalides, by the phase boundary method, optionally with the use of chain terminators, for example monophenols, and optionally with the use of trifunctional branching agents or branching agents with a functionality greater than three, e.g. triphenols or tetraphenols.

Diphenols for the production of aromatic polycarbonates and/or aromatic polyester carbonates are preferably those of formula (V)

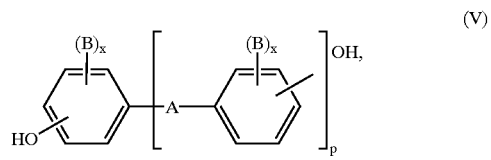

(V)

wherein

A denotes a single bond, a $C_1$–$C_5$ alkylene, a $C_2$–$C_5$ alkylidene, a $C_5$–$C_6$ cycloalkylidene, —O—, —SO—, —CO—, —S— or a $C_6$–$C_{12}$ arylene, on to which further aromatic rings, which optionally contain hetero atoms, may be condensed, or denotes a radical of formulae (VI) or (VII)

(VI)

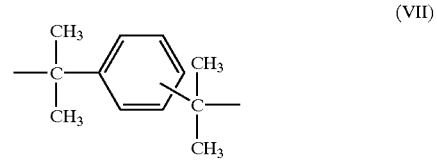

(VII)

B in each case denotes a $C_1$–$C_{12}$ alkyl, preferably methyl, or a halogen, preferably chlorine and/or bromine, x denotes 0, 1 or 2, which are each independent of each other, p denotes 1 or 0, and $R^1$ and $R^2$ may be selected individually and independently of each other for each Q, and denote hydrogen or a $C_1$–$C_6$ alkyl, preferably hydrogen, methyl or ethyl, Q denotes carbon, and m is an integer from 4 to 7, preferably 4 or 5, with the proviso that on at least one Q atom $R^1$ and $R^2$ simultaneously denote an alkyl.

The preferred diphenols are hydroquinone, resorcinol, dihydroxydiphenols, bis-(hydroxyphenyl)-$C_1$–$C_5$-alkanes, bis-(hydroxypbenyl)-$C_5$–$C_6$-cycloalkanes, bis-(hydroxyphenyl)-ethers, bis-(hydroxyphenyl)-sulphoxides, bis-(hydroxyphenyl)-ketones, bis-(hydroxyphenyl)-sulphones and α,α'-bis-(hydroxyphenyl)-diisopropylbenzenes, as well as derivatives thereof which include brominated and/or chlorinated nuclei.

Particularly preferred diphenols include 4,4'-dihydroxydiphenyl, bisphenol A, 2,4-bis(4-hydroxyphenyl)-2-methylbutane, 1,1-bis-(4-hydroxyphcnyl)-cyclohexane, 1,1-bis-(4-hydroxyphenyl)-3,3,5-trimethylcyclohexane, 4,4'-dihydroxydiphenyl sulphide and 4,4'-dihydroxydiphenyl sulphone, as well as di- and tetrabrominated or chlorinated derivatives thereof, such as 2,2-bis-(3-chloro-4-hydroxyphenyl)-propane, 2,2-bis-(3,5-dichloro-hydroxyphenyl)-propane or 2,2-bis-(3,5-dibromo-4-hydroxyphenyl)-propane.

2,2-bis-(4-hydroxyphenyl)-propane (bisphenol A) is particularly preferred.

The diphenols may be used individually or in admixture.

Diphenols are known from the literature or may be obtained by methods known from the literature.

Examples of chain terminators which are suitable for the production of thermoplastic, aromatic polycarbonates include phenol, p-chlorophenol, p-tert-butylphenol and 2,4,6-tribromophenol, and also include long chain alkylphenols such as 4-(1,3-tetramethyl-butyl)-phenol according to DE-A 2 842 005 and monoalkylphenols or dialkylphenols which contain a total of 8 to 20 C atoms in their alkyl substituents, such as 3,5-di-tert.-butyl-phenol, p-iso-octylphenol, p-tert.-octylphenol, p-dodecylphenol, 2-(3,5-dimethylheptyl)-phenol and 4-(3,5-dimethylheptyl)-phenol. The amount of chain terminators used generally varies between 0.5 mol % and 10 mol % with respect to the molar sum of diphenols used in each case.

The thermoplastic, aromatic polycarbonates have weight average molecular weights ($M_w$, as measured by ultracentrifuging or by the measurement of scattered light, for example) ranging from 10,000 to 200,000, preferably 20,000 to 80,000.

The thermoplastic aromatic polycarbonates may be branched in the known manner, preferably by the incorporation of 0.05 to 2.0 mol %, with respect to the sum of the diphenols used, of trifunctional compounds or of compounds with a functionality greater than three, for example those which contain three or more than three phenolic groups.

Both homopolycarbonates and copolycarbonates are suitable. In order to produce copolycarbonates according to the invention, 1 to 25% by weight, preferably 2.5 to 25% by weight, (with respect to the total amount of diphenols used) of poly-diorganosiloxanes which comprise terminal hydroxy-aryloxy groups may also be used. These are known (see U.S. Pat. No. 3,419,634, for example) or may be prepared by methods known from the literature. The production of copolycarbonates which contain polydiorganosiloxanes is described in DE-A 3 334 782, for example.

Apart from bisphenol A homopolycarbonates, the preferred polycarbonates also include copolycarbonates of bisphenol A which contain up to 15 mol %, with respect to the molar sum of diphenols, of diphenols other than those cited as being preferred or particularly preferred, especially 2,2-bis(3,5-dibromo-4-hydroxyphenyl)-propane.

Examples of aromatic acid halides for the production of aromatic polyester carbonates include the diacid chlorides of isophthalic acid, terephthalic acid, diphenyl ether-4,4'-dicarboxylic acids and naphthalene-2,6-dicarboxylic acids.

Mixtures of the diacid dichlorides of isophthalic acid and terephthalic acid in a ratio between 1:20 and 20:1 are particularly preferred.

During the production of polyester carbonates, a carbonic acid halide, preferably phosgene, is used in addition as a bifunctional derivative of an acid.

Apart from the aforementioned monophenols, suitable chain terminators for the production of aromatic polyester carbonates also include chlorocarbonic acid esters thereof, and acid chlorides of aromatic monocarboxylic acids which may optionally be substituted by $C_1$–$C_{22}$ alkyl groups, as well as aliphatic $C_2$–$C_{22}$ monocarboxylic acid chlorides.

The amount of chain terminators ranges from 0.1 to 10 mol % in each case, with respect to the moles of diphenols in the case of phenolic chain terminators, and with respect to the moles of dicarboxylic acid chlorides in the case of monocarboxylic acid chloride chain terminators.

The aromatic polyester carbonates may also contain hydroxycarboxylic acids as synthesis components.

The aromatic polyester carbonates may either be linear or may be branched in the known manner (in this respect, see DE-A 2 940 024 and DE-A 3 007 934 also).

Examples of branching agents which may be used include tri- or multifunctional carboxylic acid chlorides such as trimesic acid trichloride, cyanuric acid trichloride, 3,3',4,4'-benzophenone-tetracarboxylic acid tetrachloride, 1,4,5,8-napthalene-tetra-carboxylic acid tetrachloride or pyromellitic acid tetrachloride, in amounts from 0.01 to 1.0 mol % (with respect to the dicarboxylic acid dichlorides used), and tri- or multifunctional phenols such as phloroglucinol, 4,6-dimethyl-2,4,6-tri-(4-hydroxyphenyl)-heptene-2,4,4-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxy-phenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methyl-phenol, 2-(4-hydroxyphenyl)-2-(2,4-hydroxyphenyl)-propane, tetra-(4-[4-hydroxy-phenyl-isopropyl]-phenoxy)-methane or 1,4-bis[4,4-hydroxytriphenyl)-methyl]-benzene, in amounts of 0.01 to 1.0 mol % with respect to the diphenols used. Phenolic branching agents may be used with diphenols; acid chloride branching agents may be added together with acid dichlorides.

In the thermoplastic aromatic polyester carbonates, the proportion of carbonate structural units may be arbitrarily varied. The proportion of carbonate structural units is preferably to up to 100 mol %, particularly up to 80 mol %, most preferably up to 50 mol %, with respect to the sum of ester groups and carbonate groups. Both the ester- and the carbonate content of aromatic polyester carbonates may be present in the form of blocks or may be randomly distributed in the condensation polymer.

The relative solution viscosity ($\eta_{rel}$) of the aromatic polycarbonates and polyester carbonates is 1.18 to 1.4, preferably 1.22 to 1.3 (as measured on solutions of 0.5 g polycarbonate or polyester carbonate in 100 ml methylene chloride solution at 25° C.).

The thermoplastic aromatic polycarbonates and polyester carbonates may be used separately or in any mixture with each other.

Moreover, all known polyester block copolymers may be used, such as those described in U.S. Pat. No. 3,651,014.

Component B

Within the scope of the present invention, a mixture of a nitrogen compound B.1) and a phosphorus compound B.2) is used in a combined amount of 10 to 40% by weight, preferably 17 to 24% by weight, most preferably 19 to 24% by weight, with respect to the overall molding composition, in order to render the polyester molding composition flameproof.

The preferred individual content of nitrogen compound B.1) is 8 to 12% by weight, and the preferred content of phosphorus compound B.2) is 9 to 12% by weight, with respect to the overall molding composition in each case.

Substances which are suitable as nitrogen compound B.1) include melamine cyanurate, melamine, melamine borate, melamine oxalate, melamine phosphate prim., melamine phosphate sec. and melamine pyrophosphate sec., polymeric melamine phosphate and neopentyl glycol boric acid melamine. Guanidine salts such as guanidine carbonate, guanidine cyanurate prim., guanidine phosphate prim., guanidine phosphate sec., guanidine sulphate prim., guanidine sulphate sec., pentaerythritol boric acid guanidine, neopentyl glycol boric acid guanidine, urea phosphate green and urea cyanurate may also be used.

Moreover, condensed N-containing products like melem and melon may be used. Substances which are also suitable include ammonium polyphosphate and tris(hydroxyethyl) isocyanurate or the reaction products thereof with carboxylic acids, benzoguanamine and addition products or salts thereof, as well as products thereof which comprise a substituted nitrogen atom, and salts and addition products thereof. Other suitable nitrogen-containing components include allantoin compounds, as well as salts thereof with phosphoric acid, boric acid or pyrophosphoric acid, and glycolurils or salts thereof. Inorganic nitrogen-containing compounds such as ammonium salts may also be used.

Melamine cyanurate, which is the most preferred nitrogen compound within the scope of the present invention, is to be understood to be the reaction product of what are preferably equimolar amounts of melamine and cyanuric acid or isocyanuric acid.

Amongst other substances, these include all customary commercial and commercially available grades of products. Examples thereof include, amongst others, Melapur® MC 25 (supplied by DSM Melapur, Heerlen, Holland), and Budit® 315 (supplied by Budenheim, Budenheim, Germany). The melamine cyanurate which is used consists of particles with average particle diameters ranging 0.1 μm to 100 μm, preferably 0.1 μm to 25 μm, most preferably 0.1 μm to 7 μm, and may be surface-treated or coated with suitable media. Amongst other substances, the latter include organic compounds which may be deposited in monomeric, oligomeric and/or polymeric form on the melamine cyanurate. Coatings of inorganic components may also be used. For example, coating systems may be used which are based on silicon-containing compounds such as organo-functionalised silanes, aminosilanes or organosiloxanes.

Melamine cyanurate is usually obtained from the starting materials in an aqueous medium at temperatures between 90 and 100° C.

Phosphorus compound B.2) is a substance of general formula (I)

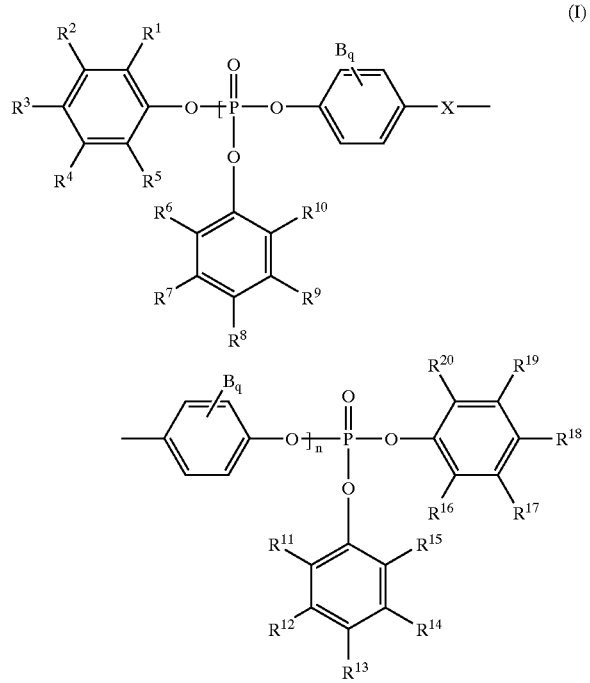

wherein
R$^1$ to R$^{20}$, independently of each other, denote hydrogen or a linear or branched C$_{1-6}$-alkyl group,
n denotes an average value of 0.5 to 50, and
B denotes a C$_1$–C$_{12}$ alkyl, preferably methyl, or a halogen, preferably chlorine or bromine, q denotes numbers which, independently of each other, represent 0, 1 or 2,
X denotes a single bond, C=O, S, O, SO$_2$, C(CH$_3$)$_2$, a C$_1$–C$_5$ alkylene, a C$_2$–C$_5$ alkylidene, a C$_5$–C$_6$ cycloalkylidene or a C$_6$–C$_{12}$ arylene, on to which further aromatic rings, which optionally contain hetero atoms, may be condensed, or a radical corresponding to formulae (II) or (III)

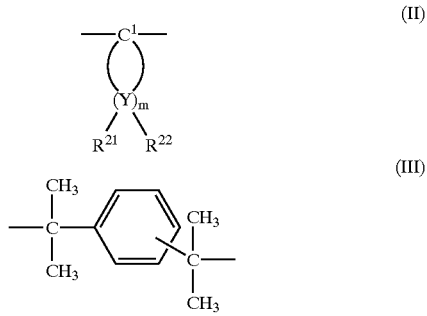

wherein Y denotes carbon, and
R$^{21}$ and R$^{22}$, independently of each other, denote hydrogen or a C$_1$–C$_6$ alkyl, preferably hydrogen, methyl or ethyl, which may be selected individually for each Y,
m denotes an integer from 4 to 7, preferably 4 or 5, with the proviso that R$^{21}$ and R$^{22}$ simultaneously denote alkyl on at least one Y atom.

The preferred phosphorus compounds of formula (I) are those in which R$^1$ to R$^{20}$, independently of each other, denote hydrogen or a methyl radical and in which q is 0. Compounds in which X denotes SO$_2$, O, S, C=O, a C$_2$–C$_5$ alkylidene, a C$_5$–C$_6$ cycloalkylidene or a C$_6$–C$_{12}$ arylene are particularly preferred. Compounds in which X=C(CH$_3$)$_2$ are most particularly preferred.

The degree of oligomerisation n is the average value which results from the method of producing the aforementioned phosphorus-containing compounds. The degree of oligomerisation n is generally <10. Compounds wherein n ranges from 0.5 to 5 are preferred; compounds wherein n ranges from 0.7 to 2.5 are particularly preferred. Compounds which comprise a high proportion of molecules with n=1, namely a proportion between 60% and 100%, preferably between 70 and 100%, most preferably between 79% and 100%, are most particularly preferred. As determined by the method of production employed, the above compounds may also contain small amounts of triphenyl phosphate. The amount of this substance is generally less than 5% by weight, wherein in the present connection compounds are preferred which have a content of triphenyl phosphate within the range from 0 to 5%, preferably from 0 to 4%, most preferably from 0 to 2.5% with respect to B.2.

Phosphorus compounds as defined by component B.2 are known (see EP-A 363 608, EP-A 640 655, for example) or may be prepared analogously by known methods (e.g. Ullmanns Encyklopadie der technischen Chemie, Volume 18, page 301 et seq., 1979; Houben-Weyl, Methoden der organischen Chemie, Volume 12/1, page 43; Beilstein Volume 6, page 177).

The bisphenol A diphosphate which is most particularly preferred within the scope of the present invention (which is also termed bisphenol A-bis-diphenyl phosphate or tetraphenyl-bisphenol A diphosphate; BDP) is commercially available, amongst other products, as Fyroflex BDP (supplied by Akzo Nobel Chemicals BV, Amersfoort, Holland), Ncendx P-30 (supplied by Albemarle, Baton Rouge, La., USA), Reofos BAPP (supplied by Great Lakes, West Lafayette, Ind., USA) or CR 741 (supplied by Daihachi, Osaka, Japan).

Component C

Zinc sulphide is used as component C) in amounts of 0.01 to 5% by weight, preferably 0.1 to 4% by weight, most preferably 0.4 to 3.5% by weight, again with respect to the overall molding composition. In certain embodiments of the present invention, the use of 0.4 to 1% by weight of ZnS is most particularly preferred. The zinc sulphide is generally used as a particulate solid. Examples of commercially available products include Sachtolith® HDS and Sachtolith® HD (both supplied by Sachtleben, Duisburg, Germany). It is also possible to use compacted material or master batches in a polymeric support material. The zinc sulphide may be surface-treated or may be coated with known media. Amongst other substances, the latter include organic compounds which may be deposited in monomeric, oligomeric and/or polymeric form. Coatings comprising inorganic components are also possible. For example, coatings may be used which are based on silicon-containing compounds such as organo-functionalised silanes or organosiloxanes.

Component E

The polyester molding composition contains, as component E, 0 to 50% by weight, preferably 10 to 40, most preferably 10 to 35% by weight of fillers or reinforcing agents.

Fiberous or particulate fillers and/or reinforcing agents which may be added include glass fibers, glass beads, glass cloth, glass mats, carbon fibers, aramid fibers, potassium titanate fibers, natural fibers, amorphous hydrated silicas, magnesium carbonate, barium sulphate, feldspar, mica, silicates, quartz, French chalk, kaolin, titanium dioxide, wollastonite, etc. These substances may also be surface-treated. The preferred reinforcing agents are commercially available glass fibers. These glass fibers, which generally have a fiber diameter between 8 and 18 μm, may be added as continuous fibers or as cut or chopped glass fibers, wherein the fibers may be coated with a suitable size system and with a bonding agent or bonding agent system, e.g. a silane-based system.

Acicular mineral fillers are also suitable. In the sense of the present invention, acicular mineral fillers are to be understood as mineral fillers with a strongly pronounced acicular character. Acicular wollastonite is an example thereof. The mineral preferably has an L/D (length/diameter) ratio of 8:1 to 35:1, preferably 8:1 to 11:1. The mineral filler may optionally be surface-treated.

Component D—Functional Additives

The use in addition of rubber-like elastic polymers (often termed impact-resistance modifiers) may be advantageous in some cases with regard to the range of mechanical properties obtainable.

The latter are most generally copolymers which are preferably synthesized from at least two of the following monomers: ethylene, propylene, butadiene, isobutene, isoprene, chloroprene, vinyl acetate, styrene, acrylonitrile or esters of acrylic or methacrylic acid which contain 1 to 18 C atoms in their alcohol component.

Polymers of this type are described, for example, in Houben-Weyl, Methoden der organischen Chemie, Volume 14/1 (Georg-Thieme-Verlag, Stuttgart, 1961), pages 392 to 406, and in the monograph by C. B. Bucknall, "Toughened Plastics" (Applied Science Publishers, London, 1977).

The rubber-like elastic polymers which are described in WO 00/46419 are preferred.

The molding compositions according to the invention may also contain other additives, such as thermal stabilizers, anti-thermal crosslinking agents, UV-stablizers, plasticizers, flow enhancers and processing aids, flame-retardant substances, internal lubricants and de-molding agents, nucleating agents, anti-static agents and stabilizers, as well as colorants and pigments. ZnS is excluded as component D.

Examples of anti-oxidants and thermal stabilizers include sterically hindered phenols and phosphites, hydroquinones, aromatic secondary amines such as diphenylamine, substituted representatives of these groups and mixtures thereof.

Suitable UV stabilizers include various substituted resorcinols, salicylates, benzotriazoles and benzophenones.

Inorganic pigments may be added, such as titanium dioxide, ultramarine blue, iron oxide and carbon black. Organic pigments may also be added, such as phthalocyanins, quinacridones and perylenes, and dyes such as nigrosin and anthraquinone, as well as other colorants, may be added as colorants.

Examples of nucleating agents which may be used include sodium phenyl phosphinate, alumina, silica and preferably French chalk.

Examples of plasticizers include dioctyl phthalate, dibenzyl phthalate, phthalic acid butyl benzyl ester, hydrocarbon oils, and N-(n-butyl)benzenesulphonamide.

The internal lubricants and de-molding agents which are generally used include ester waxes, pentaerithrytol tetrastearate (PETS), long chain fatty acids (e.g. stearic acid or behenic acid) or salts thereof (e.g. Ca or Zn stearate) and amide derivatives (e.g. ethylene-bis-stearylamide) or montan waxes (mixtures of straight chain, saturated carboxylic acids with chain lengths of 28 to 32 C atoms), and polyolefine waxes such as polyethylene or polypropylene waxes.

Polyolefine waxes are most preferably used within the scope of the present invention. A polyolefin wax is to be understood in general to mean polyolefines with a wax-like character. Compounds such as these may be obtained by methods known to one skilled in the art, either by the direct polymerisation of olefinic base monomers or by the deliberate depolymerization of polymers of correspondingly higher molecular weights, and usually have low molecular weights (about 3000–20,000 g/mol).

The molding compositions contain D) 0 to 40%, preferred 0 to 30%, very preferred 0 to 10% relative to weight of the composition of at least one functional additive.

The invention is explained in greater detail below with reference to specific examples.

EXAMPLES

| | |
|---|---|
| Component A/1 | PBT Pocan ® B 1300 00/000 (supplied by Bayer AG, Leverkusen, Germany) |
| Component A/2 | PBT Pocan ® B 1600 00/000 (supplied by Bayer AG, Leverkusen, Germany) |
| Component A/3 | PET RT 6011 (supplied by Kosa, Houston, Texas) |
| Component B/1 | melamine cyanurate (Melapur ® MC 25, supplied by DSM-Melapur, Heerlen, Holland) |
| Component B/2 | bisphenol A diphosphate (Reofos ® BAPP, supplied by Great Lakes, West Lafayette, Indiana, USA) |
| Component B/3 | triphenyl phosphate (Disflamoll ® TP, supplied by Bayer AG, Leverkusen, Germany) |
| Component C | ZnS (Sachtolith ® HDS, supplied by Sachtleben, Duisburg, Germany) |
| Component D1 | demolding agent |
| Component D2 | stabilizer, 10% concentrate in PBT Pocan B 13000 00/000 |

-continued

| Component E | chopped glass fibers (CS 7962, supplied by Bayer AG, Leverkusen, Germany) |

The individual components A) to E) were mixed in the given ratios in a double-shaft extruder, Type ZSK 32, supplied by Werner & Pfleiderer, at a temperature of 260° C., were discharged as strands, cooled until they could be granulated, and were granulated. Drying was followed by processing the granular material at a temperature of 260° C. to form standard test specimens on which the mechanical and electrical properties and fire properties were determined.

The flame-resistance of plastics is determined by the UL94V method (in this respect, see a) Underwriters Laboratories Inc. Standard of Safety, "Test for Flammability of Plastic Materials for Parts in Devices and Appliances", page 14 et seq., Northbrook 1998; b) J. Troitzsch, "International Plastics Flammability Handbook", page 346 et seq., Hanser Verlag, Munich 1990), which is extensively used in the electrical/electronics field. Using this method, the after-burn times and drip-off behavior of ASTM standard test specimens are determined.

For a flame-proofed plastics material to be classified in fire classification UL94V-0, the following criteria must be fulfilled: for a set of 5 ASTM standard test specimens (dimensions: 127×12.7×X, where X=3.2; 1.6 and 0.8 mm) all the specimens must exhibit an after-burn which is no longer than 10 seconds after two applications of 10 seconds duration of an open flame of defined height. The sum of the after-burn times for 10 ignitions of 5 specimens must not be greater than 50 seconds. Moreover, the test specimen concerned must not exhibit burning drip-off behavior, complete combustion or after-glow for longer than 30 seconds. Classification UL94V-1 requires that the individual after-burn times are no longer than 30 seconds and that the sum of the after-burn times after 10 ignitions of 5 specimens is no greater than 250 seconds. The total after-glow time must not be longer than 250 seconds. The remaining criteria are identical to those mentioned above. A material is given a fire classification of UL94V-2 if it exhibits burning drip-off behavior but fulfills all the other criteria of classification UL94V-1.

Another test of the flame-resistance of plastics is the glowing wire test according to DIN IEC 695-2-1. In this test, 10 test specimens, for example panels of geometry 60×60×2 mm or 1 mm) are tested, using a glowing wire at temperatures between 550 and 960° C., and the maximum temperature is determined at which an after-burn time of 30 seconds is not exceeded and the specimen does not exhibit burning drip-off behavior. This test is also of particular interest in the electrical/electronics field, since, in the event of fire or in cases of overload, components in electronic products may reach temperatures such that parts in their immediate vicinity may ignite. Conditions of thermal loading such as these are reproduced in the glowing wire test.

Information on the electrical properties of the plastics molding compositions investigated was obtained by the CTI test according to DIN IEC112, in which the tracking resistance of the material was determined.

Data on the mechanical properties of a polymer compound were obtained from a tensile test according to ISO 527 (testing of necked bars), from a bending test according to ISO 178 (testing of flat bars of geometry 80 mm×10 mm×4 mm) and from an Izod impact bending test (ISO180, testing performed on flat bars of geometry 80 mm×10 mm×4 mm).

Weight Loss After Ageing in Hot Air

In order to determine the weight loss after hot air ageing of plastics molding compositions obtained by compounding, color sample panels of geometry 60 mm×40 mm×4 mm were produced by injection molding and were kept at 125° C. and at 155° C. for 10 days in a drying oven. The weight loss is given as a percentage with respect to the freshly injection molded test specimens.

TABLE 1

| Component (parts by weight) | Example 1 | Example 2 | Comparison 1 | Comparison 2 | Comparison 3 |
|---|---|---|---|---|---|
| A/1 | 28.2 | 28.2 | 9.7 | 32.2 | 30.2 |
| A/2 | — | — | 17.0 | — | — |
| A/3 | 20.0 | 20.0 | 20.0 | 20.0 | 20.0 |
| B/1 | 8.0 | 10.0 | 10.0 | 8.0 | 10.0 |
| B/2 | 12 | 10.0 | — | 8.0 | 8.0 |
| B/3 | — | — | 11.0 | — | — |
| C | 0.5 | 0.5 | 1.0 | 0.5 | 0.5 |
| D1 | 0.3 | 0.3 | 0.3 | 0.3 | 0.3 |
| D2 | 1.0 | 1.0 | 1.0 | 1.0 | 1.0 |
| E | 30.0 | 30.0 | 30.0 | 30.0 | 30.0 |
| Glowing wire resistance (IEC 695-2-1) 2 mm | 960° C. | 960° C. | 960° C. | 700° C. | 850° C. |
| UL 94 (0.8 mm) | V-2 | V-2 | V-2 | V-2 | V-2 |
| Weight loss after 10 days at 125° C. | n.d. | 0.16% | 7.20% | n.d. | n.d. |
| Weight loss after 10 days at 155° C. | n.d. | 0.22% | 8.38% | n.d. | n.d. |
| CTI A (IEC 112) | n.d. | 450 V | 400 V | 425 V | n.d. | n.d. = not determined

The molding compositions according to the invention were distinguished from the comparison examples by a very low weight loss when subjected to elevated temperatures for extended periods, as may clearly be seen from a comparison of example 2 and comparison 1. This firstly results in processing advantages (e.g. the avoidance of deposit formation during injection molding processing), and secondly ensures that important properties of the material are retained, such as the flame resistance thereof. Moreover, the test results clearly show that defined amounts of flame retardant additives B/1 and B/2 are necessary, particularly for maximum glowing wire resistance (see comparison 2, comparison 3).

Assessment of the Corrosion Behavior on Metal Strips

Tests to assess the corrosion behavior of the plastics molding compositions were performed on metal strips approximately 50 mm long 6 mm wide and 0.5 mm thick embodiment made of brass, copper and bronze. For this purpose, the metal strips were first cleaned with a brush before testing, washed with water, and after rinsing with acetone were subsequently thoroughly rubbed dry with a soft cloth. The metal strips which were treated in this manner were then placed in a conical flask filled with 150 ml of granules so that about half the strip concerned protruded vertically from the granules and the other half was well covered by the granules. After a test duration of 21 days at 125° C. or at 155° C., the metal strips were assessed visually for discoloration or deposition on the contact faces. The results for two examples are given in Table 2.

TABLE 2

|  | Comparison 1 | | Example 2 | |
| --- | --- | --- | --- | --- |
|  | In granules | Above granules | In granules | Above granules |
| 125° C. brass | O | O | O/− | O/− |
| 155° C. | O | − | − | − |
| 125° C. copper | +/O | + | O/− | O |
| 155° C. | ++ | + | O/− | O |
| 125° C. bronze | O/+ | O/+ | − | − |
| 155° C. | ++ | ++ | O/− | O/− |

Discoloration/contact deposition assessment rating
"−−" denotes very slight;
"−" denotes slight;
"O" denotes medium;
"+" denotes considerable;
"++" denotes very considerable.

A comparison of the corrosion results of Example 2 (according to the invention) and of comparison 1 shows that corrosion and contact deposition is considerably reduced, which constitutes a significant advantage for electrical and electronic applications as regards safety in use.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A molding composition comprising

A) one or more members selected from the group consisting of polyester, polycarbonate and polyestercarbonate, B) 10 to 40% relative to the weight of the composition of a flame retardant component containing a nitrogen compound B.1) and a phosphorus compound B.2) of formula (I)

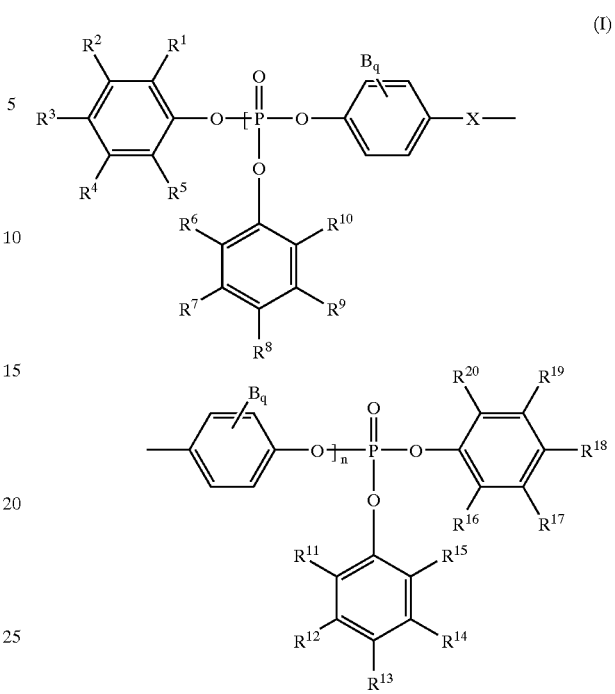

wherein
$R^1$ to $R^{20}$, independently of each other, denote hydrogen or a linear or branched $C_{1-6}$-alkyl group,
n denotes an average value of 0.5 to 50, and
B denotes a $C_1$–$C_{12}$ alkyl or a halogen,
q independently one of the other represent 0, 1 or 2,
X denotes a single bond, C=O, S, O, $SO_2$, $C(CH_3)_2$, a $C_1$–$C_5$ alkylene, a $C_2$–$C_5$ alkylidene, a $C_5$–$C_6$ cycloalkylidene or a
$C_6$–$C_{12}$ arylene, or a radical corresponding to formulae (II) or (III)

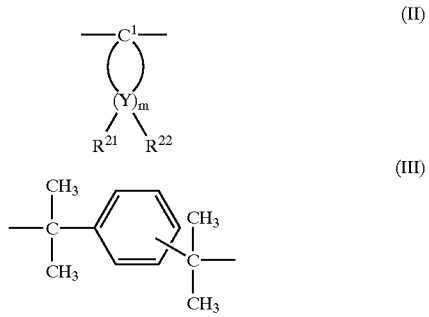

wherein
Y denotes carbon and
$R^{21}$ and $R^{22}$, independently one of the other denote hydrogen or a $C_1$–$C_6$ alkyl and which may be selected individually for each Y,
m denotes an integer from 4 to 7 with the proviso that $R^{21}$ and $R^{22}$ simultaneously denote alkyl on at least one Y atom, C) 0.01 to 5% relative to the weight of the composition, of zinc sulphide, D) 0.3 to 40% relative to the weight of the composition of polyolefin wax, E) 0 to 50% relative to the weight of the composition of one or more fillers and/or reinforcing agents, wherein the sum of the proportions of the components totals 100% by weight.

2. The molding composition according to claim 1 wherein A) is one or more polyalkylene terephthalate.

3. The molding composition according to claim 1 wherein A) is at least one member selected from the group consisting of polyethylene terephthalate and polybutylene terephthalate.

4. The molding composition according to claim 1 wherein B) is present in an amount of 17 to 24%.

5. The molding composition according to claim 1 wherein the nitrogen compound B.1) is present in an amount of 8 to 12% relative to the weight of the composition.

6. The molding composition according to claim 1 wherein the phosphorus compound B.2) is present in an amount of 9 to 12% relative to the weight of the composition.

7. The molding composition according to claim 1 wherein the nitrogen compound B.1) is melamine cyanurate.

8. The molding composition according to claim 1 wherein the phosphorus compound B.2) is bisphenol A-bis-diphenyl phosphate.

9. The molding composition according to claim 1 wherein functional additive is selected from the group consisting of anti-thermal decomposition agents, anti-thermal crosslinking agents, agents which protect from damage due to ultraviolet light, plasticizers, flow enhancers, processing aids, flame-retardant substances, internal lubricants and de-molding agents, nucleating agents, anti-static agents, stabilizers, colorants and pigments.

10. The molding composition according to claim 1 wherein reinforcing agents are glass fibers.

11. A method of using the molding composition according to claim 1 comprising producing a molded article.

12. A molded article comprising the composition of claim 1.

* * * * *